Oct. 15, 1968 J. P. MENTINK 3,405,989
INVERTED OR METALLOGRAPHIC TYPE OF MICROSCOPES
Filed March 30, 1964 9 Sheets-Sheet 1

INVENTOR.
JOHN P. MENTINK
BY Frank C. Parker
ATTORNEY

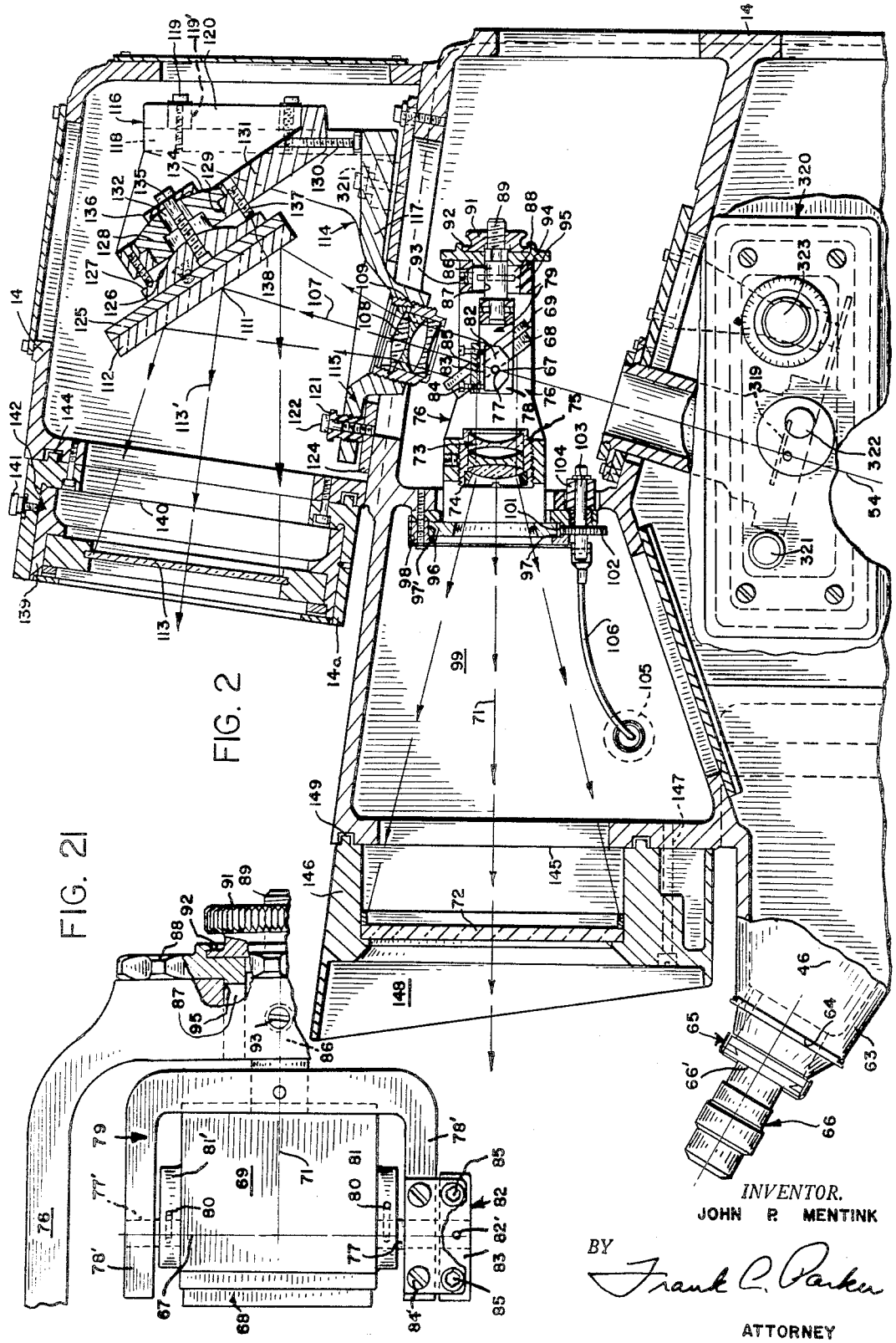

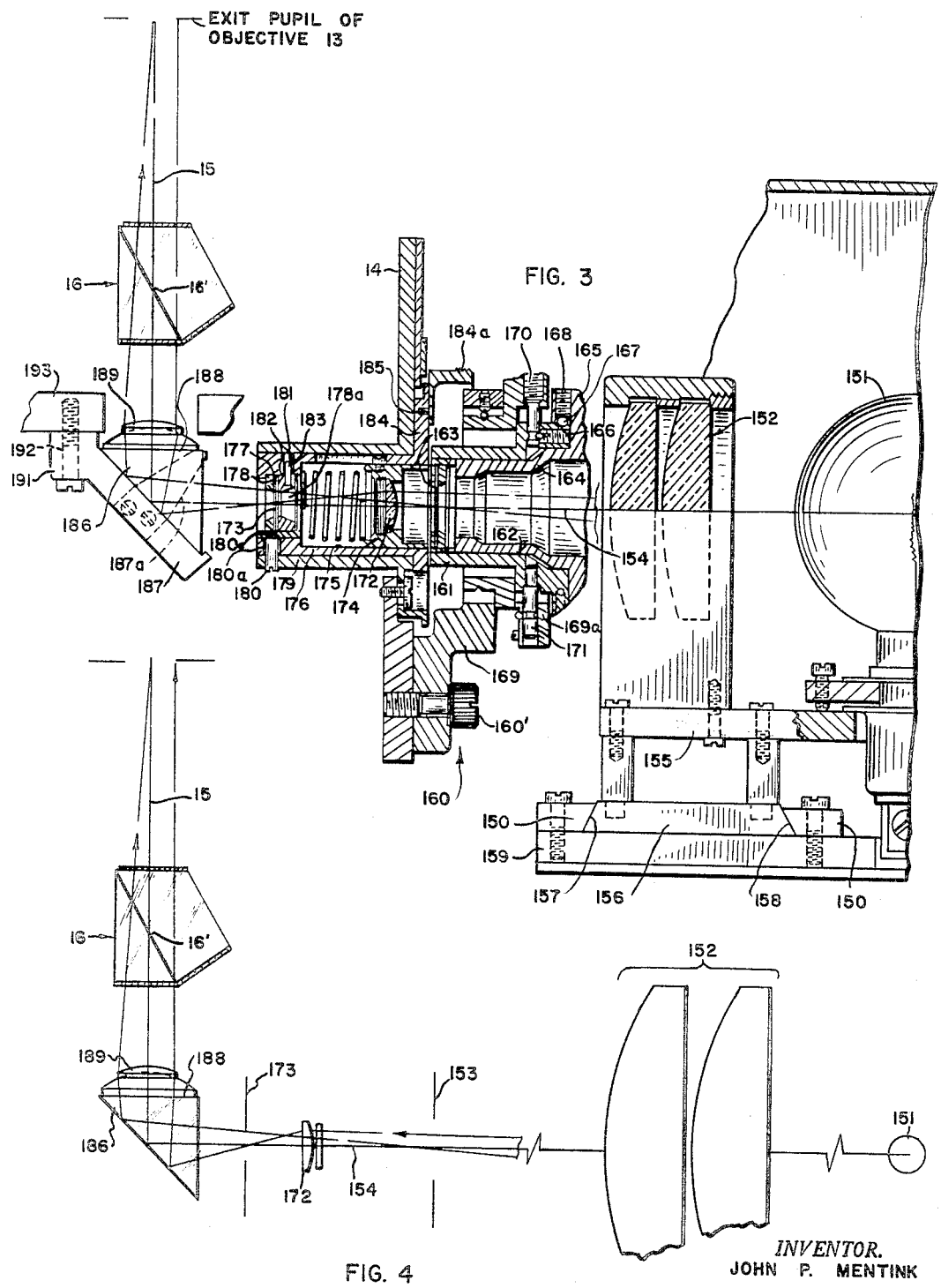

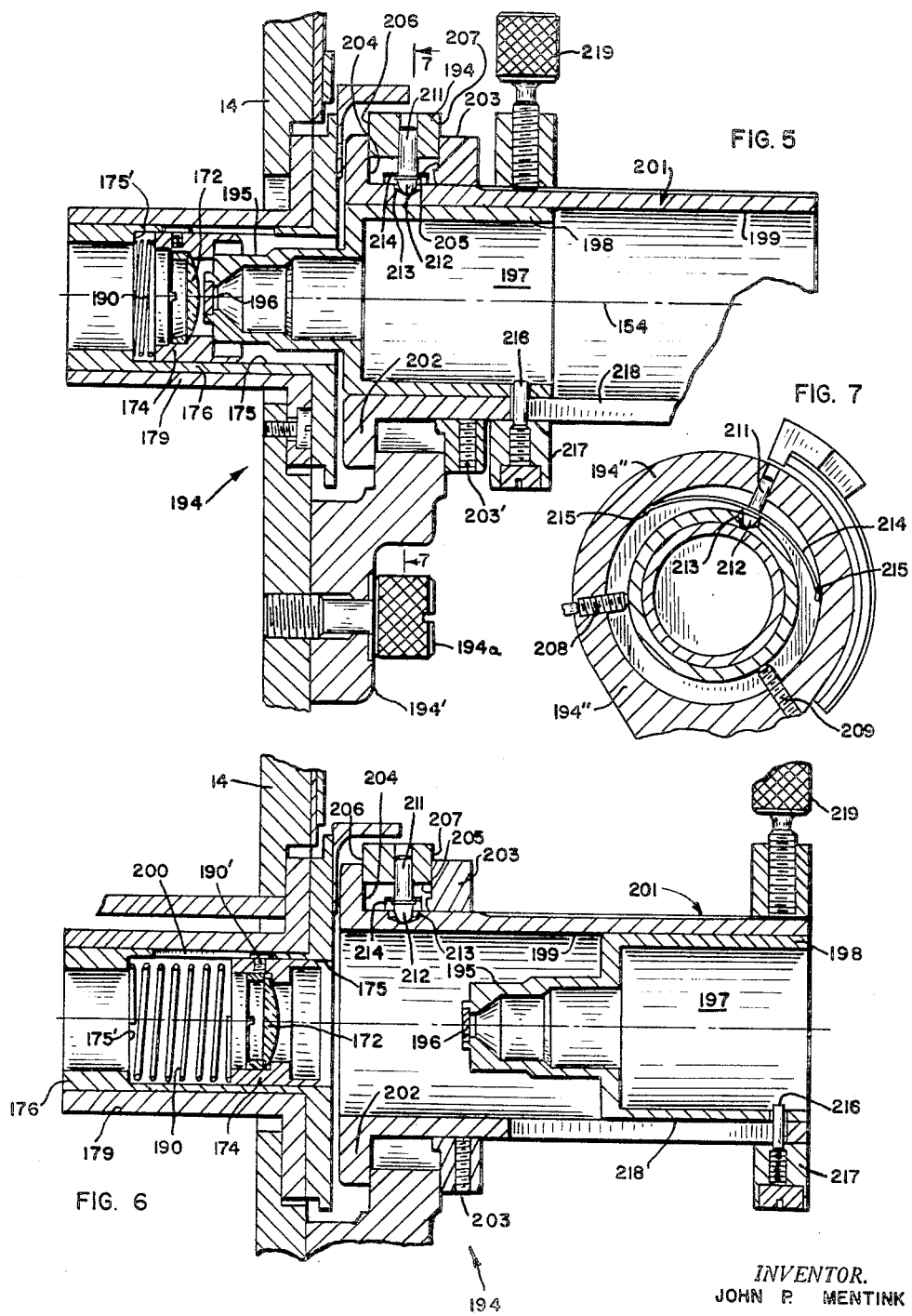

Oct. 15, 1968  J. P. MENTINK  3,405,989
INVERTED OR METALLOGRAPHIC TYPE OF MICROSCOPES
Filed March 30, 1964  9 Sheets-Sheet 5
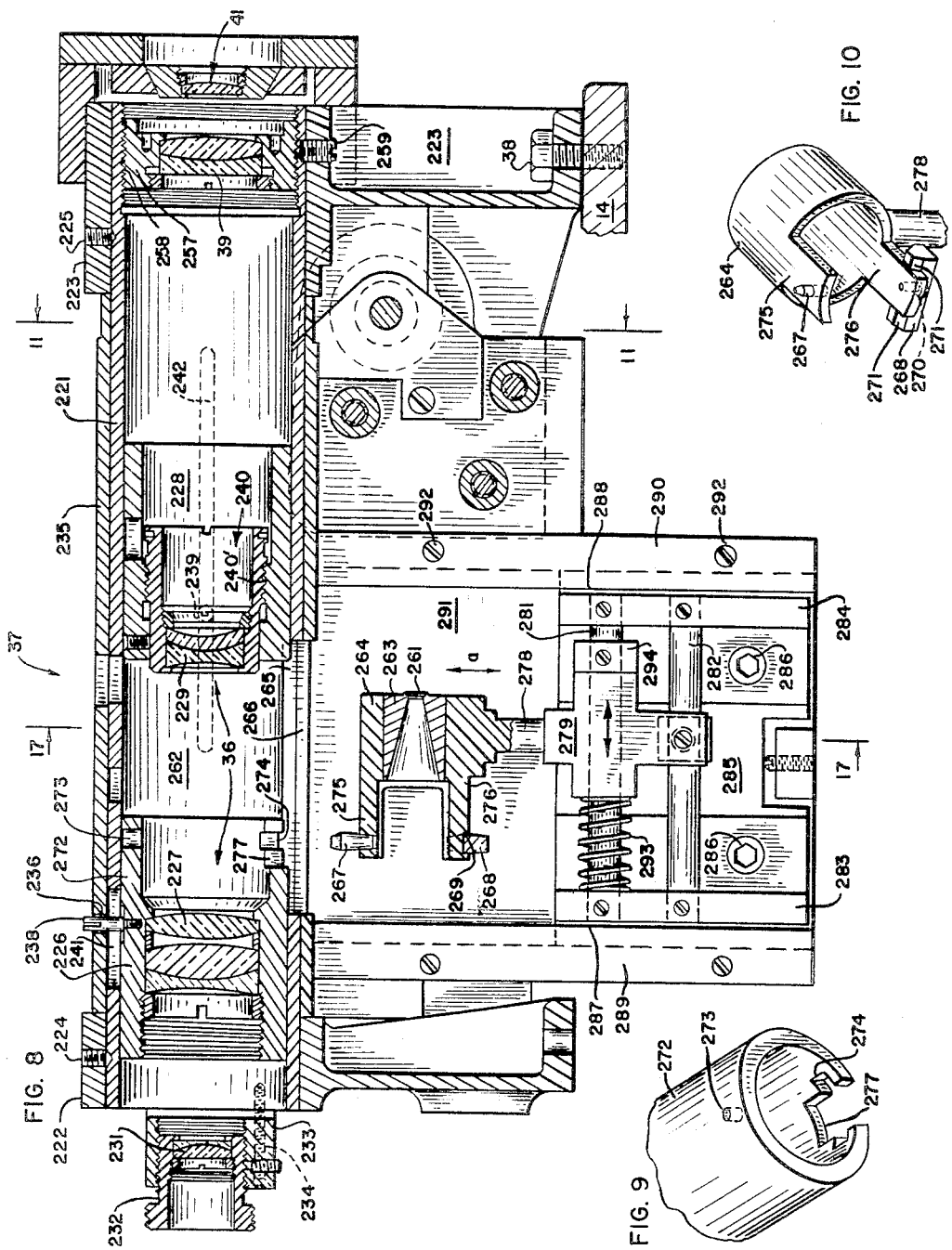
JOHN P. MENTINK
INVENTOR.
BY Frank C. Parker
ATTORNEY

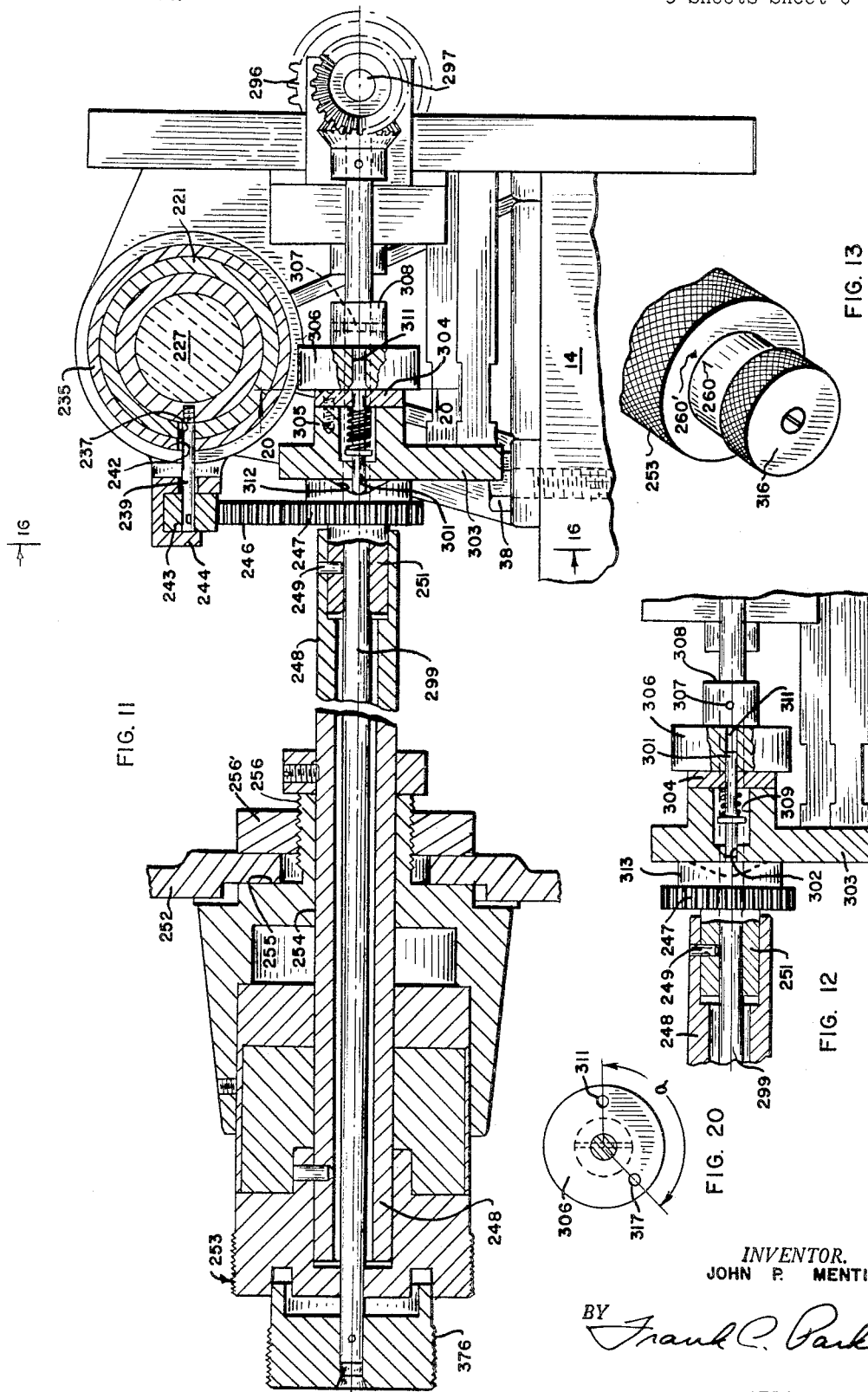

Oct. 15, 1968     J. P. MENTINK     3,405,989
INVERTED OR METALLOGRAPHIC TYPE OF MICROSCOPES
Filed March 30, 1964     9 Sheets-Sheet 7

JOHN P. MENTINK
INVENTOR.

BY Frank C. Parker

ATTORNEY

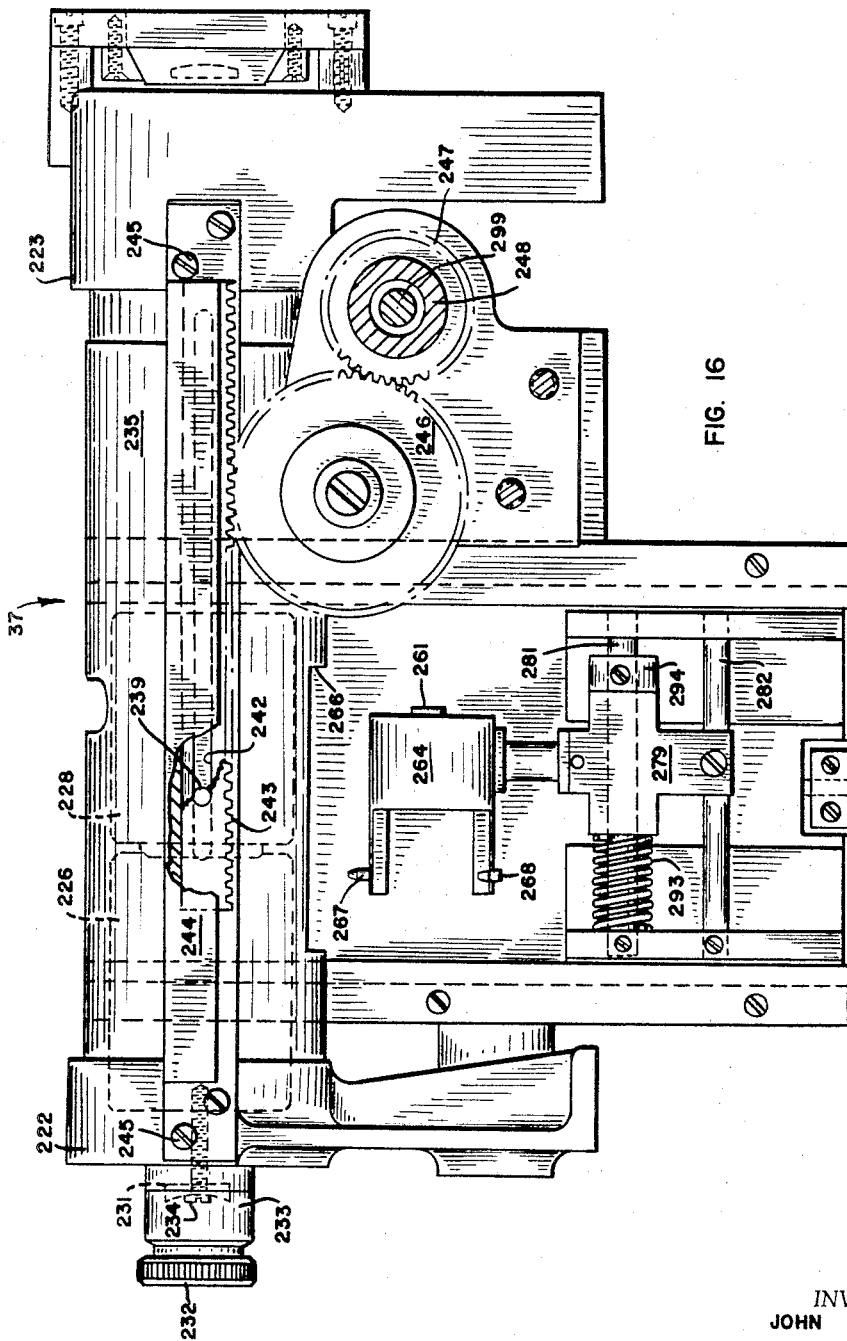

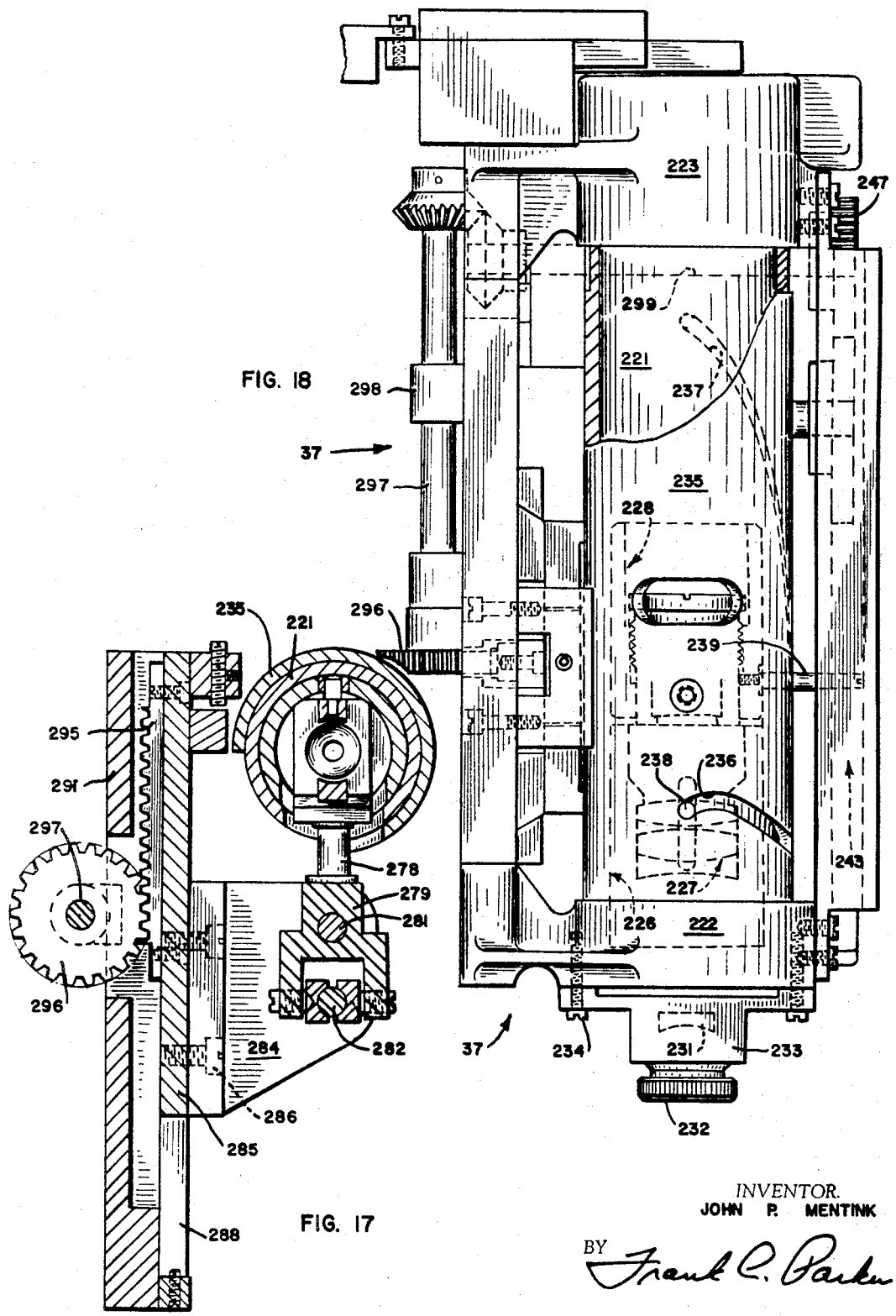

United States Patent Office 3,405,989
Patented Oct. 15, 1968

3,405,989
INVERTED OR METALLOGRAPHIC TYPE OF MICROSCOPES
John P. Mentink, Pittsford, N.Y., assignor to Bausch & Lomb Incorporated, Rochester, N.Y., a corporation of New York
Filed Mar. 30, 1964, Ser. No. 355,823
10 Claims. (Cl. 350—10)

ABSTRACT OF THE DISCLOSURE

A multipurpose metallographic type of miscroscope is described having mechanism for mounting and controlling the operation of a complex optical system which includes a zoom optical system and auxiliary equipment commonly used with microscopes such as phase plates, for instance.

---

This invention relates to a microscope of the inverted or metallographic type and more particularly it relates to improvements in the mechanical features thereof.

Because of the expanding development of metallurgical technology, the need for a commensurate development in microscope apparatus is apparent so that a complete and thorough inspection and investigation of metallurgical specimens of various kinds may be expeditiously conducted by the use of a single multiuse instrument.

It is customary currently to conduct certain parts of a metallurgical examination on one instrument and then transfer the specimen to other instruments having specialized equipment suitable for the remaining parts of the examination. Users have long sensed the desirability of a metallurgical microscope which combined in an advantageous manner the advanced equipment including the latest developments in illumination devices, phase microscopy, change of magnification devices, filters, tint plates, photographic and viewing mechanism, compensating lenses, et al.

In view of this need, it is an object of this invention to provide a novel inverted or metallographic type of microscope which is versatile in use to meet new advances in metallurgical technology, is capable of high grade optical and mechanical performance, and wherein conversion from one condition of operation to another to serve diversified uses is accomplished quickly and easily by internal built-in mechanism.

It is a further object of this invention to provide such a microscope having inherent capabilities for using a plurality of so-called auxiliary devices such as phase contrast equipment, tint plate and retardation plate equipment as well as polarization and phase contrast equipment together with the such other equipment as diaphragming and photographic mechanism.

A further object is to provide such a device in which the image of the specimen may be seen on a viewing screen while said image may alternatively be viewed critically by the eyepiece of the instrument.

A still further object of this invention is to provide such a device wherein the magnification of the image may be continuously varied or zoomed through a relatively large range of magnifications so that it is unnecessary to employ eyepieces of different powers to change the magnification of the image.

Another object of this invention is to provide an improved metallurgical microscope wherein certain aberrations, such as lateral color aberrations may be controlled and compensated by internal optical means whereby the need of changing eyepieces to suit the objective in use is obviated, and wherein various comparison indicia may be introduced into the optical system internally to enhance the excellence and scope of the operational capabilities of the instrument.

A further object of this invention is to provide such a device which incorporates means whereby various functional members of the optical system are adapted for producing phase contrast effects, and these effects may be secured precisely in optical alignment even though the prime objectives of varied optical dimensional qualities be substituted.

Another object is to provide such a device which includes optical and mechanical elements for testing and adjusting the optical alignment of said members and for determining the conjugates of the lens system.

Further objects and advantages will be apparent in the arrangement and combination of the parts of the microscope and in the detailed structure as described in the specification herebelow and shown in the accompanying drawings, wherein:

FIG. 1 is a partial generally midsectional view taken substantially vertically through a microscope constructed according to the present invention and showing the lower part thereof;

FIG. 2 is a view similar to FIG. 1 showing the upper part of said microscope contiguous to said lower part;

FIG. 3 is an optical diagram of the parts comprised in the illuminaton mechanism, said parts being shown in an operative position;

FIG. 4 is a view similar to FIG. 3 showing said parts in a different operative position;

FIG. 5 is an enlarged midsectional view of certain parts of the mounting mechanism for the illuminating and phase contrast effecting means, said parts being shown in one operative position;

FIG. 6 is a view similar to FIG. 5 showing said parts in a different operative position;

FIG. 7 is a sectional view taken on the line 7—7 of FIG. 5;

FIG. 8 is an enlarged midsectional view of certain other parts of the mounting mechanism for the zoom optical system and phase contrast effecting means shown in one operating position;

FIG. 9 is an enlarged perspective view partly broken away of an operating part shown in FIG. 8;

FIG. 10 is a perspective view partly broken away of an operative part which cooperates with the part shown in FIG. 9;

FIG. 11 is an enlarged sectional view, partly broken away, of an actuating control mechanism;

FIG. 12 is a view similar to FIG. 11 broken away to show that mechanism in a second operative position;

FIG. 13 is an enlarged perspective view of the control knob structure shown in FIG. 11;

FIG. 16 is a side elevation of the phase plate transport mechanism;

FIG. 17 is a cross-sectional view taken on the line 17—17 of FIG. 8;

FIG. 18 is a plan view of the mechanism shown in FIG. 16;

FIG. 19 is a sectional view taken on the line 19—19 of FIG. 1;

FIG. 20 is a cross-sectional view taken on the line 20—20 of FIG. 11; and

FIG. 21 is an enlarged plan view partly broken away of a part of the mechanism shown in FIG. 2.

Figure 14:
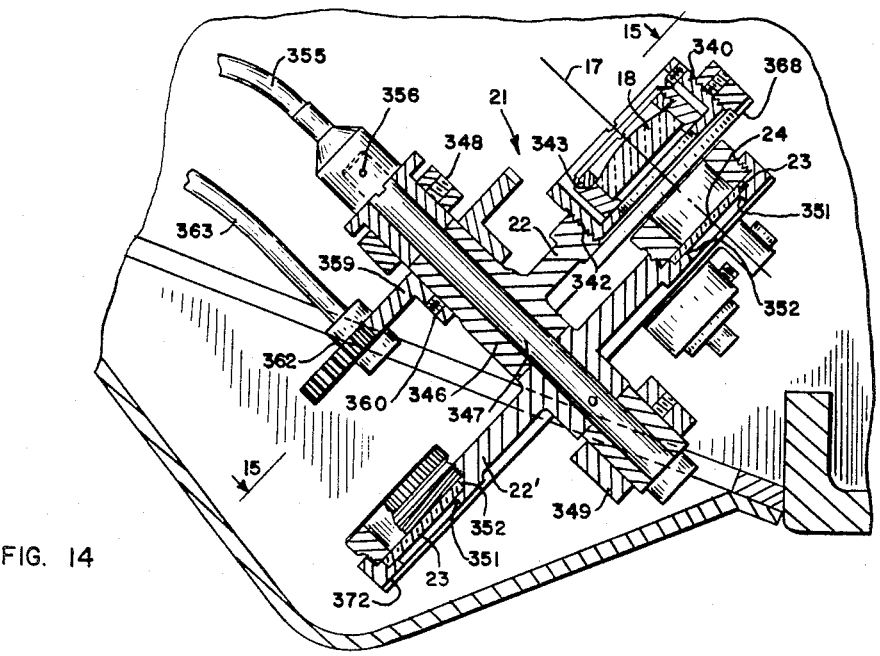
FIG. 14 is an enlarged side elevational view mostly in section of mounting mechanism for certain operating optical parts of the microscope.

A preferred form of the present invention is shown in the drawings wherein the metallographic microscope is designated generally by numeral 10. According to the present invention, several organizations or combinations of mechanical parts are comprised in the microscope, each such group having a distinctive function or functions which cooperatively form the microscope 10 in its plural operational forms.

Said mechanical organizations in the instrument include a stage 11 whereon a specimen 12 is held and an objective 13 which is supported as described hereinafter in a frame 14, said objective being focused upon and optically aligned with said specimen 12 on a vertical portion 15 of the optical axis of the microscope. Image rays reflected from specimen 12 are projected by said objective 13 into a beam dividing prism 16 having an oblique reflecting surface 16' which directs the major portion of said rays rearwardly and downwardly with reference to the stage 11 and objective 13 along a second portion 17 of the optical axis of the instrument.

Figure 15:
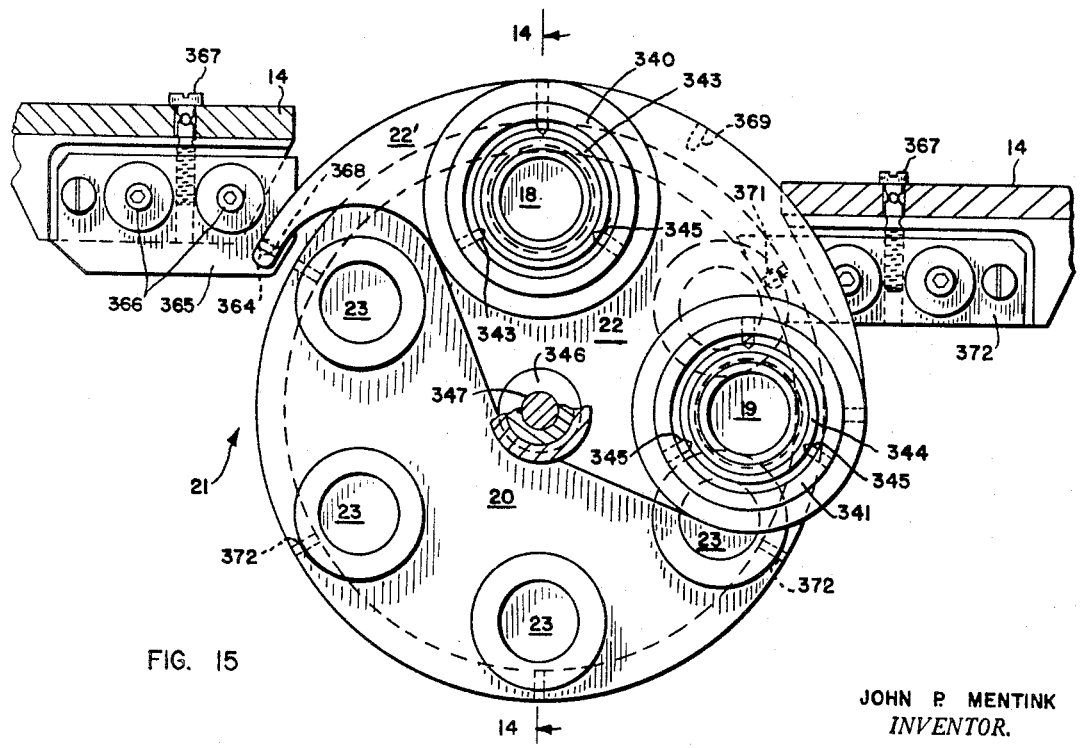
FIG. 15 is a top view partly in section taken substantially on the line 15—15 of FIG. 14.

Near the focal point of the objective 13 on axis 17 is located a plurality of lateral color compensating lenses 18, 19 as shown in FIGURE 15 which are selectively positioned in alignment with axis 17 as shown in FIGURE 1, and a mechanical mounting device 21 therefor is provided as described more particularly hereinafter. Said mounting device 21 comprises a sector-shaped carrier 22 for holding lenses 18 and 19 but further comprises a wheel 20 that holds a plurality of reticle plates 23 selectively at a focal point 24, FIG. 14, on the second portion 17 of the optical axis, said focal point being jointly formed by the objective 13 and lenses 18 or 19.

At a fixed point 25 below said plates 23 on axis 17 is secured adjustably a plane mirror 26 by means of a mirror mounting mechanism 27. Said mirror mounting mechanism comprises a plate 28 whereon mirror 26 is fixed in any suitable manner, said plate being pivotally hung on a substantially horizontal pivot pin 29 which is so located that its axis coincides with the reflective face of the mirror. At its ends, pivot pin 29 is supported by and between the bifurcated ends of a yoke 31, and an extension 32 is formed on plate 28 so as to project freely underneath said yoke. In the end of said extension 32 is threaded a pair of push and pull adjustment screws which are in operative contact with yoke 31 whereby the angular position of the mirror about said pin 29 is regulated. Said mirror 26 is mounted furthermore for transverse rocking motion to adjust optical alignment by supporting the yoke 31 on one end of a second horizontal pin 33 which is journaled at its other end in the stationary block 34.

From the plane mirror 26, the beam of image rays is directed upwardly along a third portion 35 of the optical axis through a zoom or continuously variable magnification optical system 36 which is mounted in a subassembly mechanism designated by numeral 37, the constituent parts thereof being described in detail hereinafter. Said subassembly mechanism 37 is secured in any preferred manner such as the bolts 38 to the frame 14, the fitting of the bolt holes being loose enough to permit limited alignment adjustment movements with reference to the optical axis of the microscope.

In the upper end of subassembly mechanism 37 is secured one of the erector lenses 39 belonging to an image erector lens system, lens 39 being so located for obtaining the advantages and improvements of good optical alignment and sturdiness and reliability of the mounting mechanism as described hereinafter in connection with the description of the zoom subassembly mechanism 37. The upper end of mechanism 37 also holds an insertable focusing lens 41 which is selectively introduced into the optical system so that an image of the phase pattern, which is formed by said optical system and is described herebelow, may be viewed. For facilitating introduction of lens 41 into the optical system during the course of a phase examination, said lens is secured on a lens plate 42 which is slidably mounted in the assembly 37 between a pair of opposite lateral slideways or tracks 43.

At a second fixed point 44 on the third portion 35 of the optical axis above said mechanism 37, a second plane mirror 45 is located, said mirror being so inclined relative to said axis portion 35 that the axis of the bundle of image rays is deviated therefrom upwardly and forwardly over the stage 11 along a fourth portion 46 of the optical axis. Mirror 45 is held so as to be interchanged with a beam divider 47 preferably held on a mirror slide 48 which is slidably held crosswise or normal to axis 35 by a pair of slideways 49 formed on a stationary bracket 51 attached to the frame 14 as shown in FIG. 19. Said mirror slide 48 is preferably constructed with mirror seating plates 52 and 53 for mirrors 45 and 47 respectively which are crossed relative to each other so that beam divider 47 when moved into alignment with said optical axis refracts a portion of the image rays forwardly along the fourth portion 46 of optical axis, also reflects another portion of the rays backwardly from fixed point 44 along an extension of fourth portion 46, and furthermore allows still another portion of the rays to pass through the divider along a fifth portion 54 of the optical axis which is coextensive with said third axis portion 35. In the slide 48 is also provided a clear aperture 55 which is alignable with axes 35 and 54 when placed in operative position for an unobstructed view through said slide as shown in FIG. 19.

A second erecting lens 56 is mounted in a lens tube 57 by suitable means, as indicated in FIG. 1, and the tube is demountably secured at one end in a bore 58 which is formed in bracket 51 whereby a rigid, durable and optically well aligned mounting of lens 56 is secured which is stationary relative to the fixed point 44 on axis portion 35. In an axial position conjugate to lens 56, a third erecting lens 59 is located on the fourth axis portion 46, said lenses 56 and 59 being substantially duplicates and being comprised in the aforesaid erecting lens system. As shown in FIG. 1 of the drawing, erecting lens 59 is fixed in a lens cell 61 which is exteriorly threaded or frictionally fitted into a stationary mounting ring 62 for axial adjustments therein whereby focal conditions in said erecting lens system may be regulated.

The frame 14 has formed on the front side thereof a slanted forwardly extending part 63 overhanging the stage 11 and serving as a support for the aforesaid mounting ring 62. Through said part 63 extends said fourth portion 46 of the optical axis from the fixed axial point 44. On the upper end of said part 63 of the frame is formed a mounting surface 64 as shown in FIG. 2 extending normal to axis portion 46 whereon is secured an eyepiece body 65 of conventional structure containing the optical parts of an eyepiece assembly 66 which are located in optical alignment with axis portion 46 in a position to view the image transmitted by the erector lenses. The eyepiece 66 may be of any desired type such as monocular, binocular or other form currently used on miscoscopes having a mounting shoulder 66'.

At a third fixed point 67 located on the fifth axis portion 54, a mirror 68 is held in a mounting block 69 in such an angular position relative to axis 54 that a part of the image rays received thereon from erector lens 56 are deflected horizontally along a sixth portion 71 of the optical axis to impinge upon a ground glass screen 72. The screen 72 faces the operator at approximately the eye level of the operator whereby an image of the specimen is coincidentally formed in the eyepiece 66 and on the screen 72. Adjacent to the mirror 68 on the sixth portion 71 of the optical axis is mounted a negative amplifier lens 73 which forms an enlarged visible image on viewing screen 72. Lens 73 is suitably secured in a lens cell 74 which is exteriorly threaded or otherwise held for axial adjustment into a tapped bore 75 formed concentrically with axis 71 on a support yoke 76. In the yoke 76 is also adjustably held the aforesaid mirror plate 68 since the mirror mounting plate 69 is tiltable to align the transmitted sixth portion 71 of the optical axis with the optical axis of lens 73.

Such an adjustment mechanism comprises two pivot trunnions 77 and 77' which are journaled in the two arms 78 and 78' of an inner yoke 79. By means of a pair of side lugs 81, 81' formed on the peripheral parts of the support plate 69 and pierced by the pivot trunnions 77 and 77', the mirror 68 is supported on the rod for swinging motion about the point 67. Said lugs are secured preferably by dowel pins 80 to the trunnions 77 and 77'. On the trunnion 77 is fixed by a dowel 82' a tilt control lever 82 which is located outwardly from said arm 78. A flat working surface 83 is formed thereon. Extending over the working surface 83 of the control lever 82 and spaced therefrom is a stationary plate 84 which is held on the arm 77 by suitable means such as the screws 84'. Adjacent the opposite ends of said lever 82, a pair of adjusting screws 85 which are equally spaced from the trunnion 77 are adapted to bear, said screws being threaded through the stationary plate 84.

For adjusting the mirror plate 68 in a direction along the sixth axis portion 71, the inner yoke 79 is provided with a shaft or stud 86 which is axially slidably and nonrotatably fitted into an accommodating bore 87 and is provided with a bushing member 88 which is seated in a suitable bore formed in one end of the support yoke 76, the bushing member normally being in spaced relation to the inner yoke 79. Travel of the shaft or stud 86 axially of the bore 87 to promote optical alignment of the mirror plate 68 is provided by a thread 89, FIG. 2, formed on the end of the stud, said thread being engaged with a tapped hole formed in an adjusting nut 91. Said adjusting nut is mounted by a swivel connection 92 onto the outer face of said bushing member 88 and the member is locked into the support yoke 76 by suitable means such as a set screw 93 so that a tractive action is provided for the shaft 86 by nut 91 as it is rotated. Non-rotability of the stud or shaft 86 is provided preferably by seating a cross pin 94 in the stud 86, said pin extending at each end into a pair of opposed slidably fitted longitudinal slots 95 formed in bushing member 88.

Angular adjustments of the mirror plate 68 about the sixth portion 71 of the optical axis are accomplished by rotating the bushing member 88 in the accommodating bore 87 in yoke 76 so that upon release of set screw 93, the inner yoke 79 may be rotated and again locked by the set screw.

For the purpose of moving the mirror plate 68 from active to inactive position, the support yoke 76 is mounted on a slide 96 in cantilever manner and said slide is slidably fitted to be retained in a pair of slideways 97, 97' formed on a vertical cross wall 98 extending across an open chamber 99 formed in the upper part of the frame 14 adjacent to the viewing screen 72. Means for moving the slide 96 along the slideways 97 comprises preferably a toothed rack 101 formed along the lower side of the slide, and a pinion 102 fixed onto a pinion shaft 103 which is journaled in a bearing structure 104 formed in the cross wall 98. Said shaft 103 is rotated by a remote control knob 105 which is preferably drivingly connected by a Bowden wire actuating cable 106 to the pinion shaft 103.

With regard to the beam splitter mounting mechanism above described, such mechanism is constructed in the form of a subassembly which is self-contained and possesses the advantages of (a) excellent prealignment as a unit of the composite parts which are the amplifier lens 73, the mirror plate 68 and its supporting and adjusting mechanism, (b) the uniting of the operating parts in a subassembly which can be moved out of the optical path 54 of the instrument quickly without any disassembly operation but which can be quickly restored to the optical system in operative condition without any further adjustments.

The beam of image rays which is passed upwardly past the fixed point 67 along a seventh portion 107 of the optical axis is coextensive with the fifth portion 54 and is projected through a second amplifier lens 108 which is mounted in an adjustable lens cell 109. Upwardly of lens 108 at a fourth fixed point 111 on the axis portion 107 is held a plane mirror 112 in an inclined position relative to said axis such that said image rays are deviated forwardly upon a photographic plate 113 or other photo recording device. Said device is located along an eighth axis portion 113' in the highest part of the frame 14 above the viewing screen 72, the amplifier lens 108 serving to form an enlarged image of the specimen on plate 113.

Both the amplifier lens 108 and the plane mirror 112 are movably mounted as a unit and individually for a plurality of necessary optical alignment adjustments in a two-part subframe 114 comprising a lower part 115 and an upper part 116 joined thereto. In the lower part 115 is threaded for focusing purposes, as aforesaid, the amplifier lens cell 109 so that focusing motion in an axial direction may be effected. Said lower part 115 is an L-shaped member having a flat base portion 117 in which lens 108 is carried and an upright bracket portion 118 whereon the upper part 116 is secured by screws 119 extending through elongated holes 119' in a mounting flange 120 formed on part 116 and threaded into tapped holes in bracket 118 whereby relative vertical movements of part 116 may be accomplished.

A leveling adjustment mechanism is built into the base portion 117 of the subframe 114 in the form of three elevating screws 121, one of which is shown, which are threaded through the base portion 117 in substantially equiangularly spaced relation to each other so that the subframe 114 rests on the ends of said screws. Suitable screw heads are provided on the upper end of the elevating screws 121 for turning the same. Each elevating screw is drilled through axially to accommodate a clamping bolt 122 which extends therethrough and is threaded into a stationary base plate 124 to primarily clamp the subframe 114 onto said plate and secondarily lock the elevating screws 121 in adjusted position. Adjustment of the screws 121 may be made to effect movements of the axis of the amplifier lens 108 in two axial planes which are normal to each other and include said axis so that said lens may be properly aligned with the optical axis of the microscope and the plate 113.

Plane mirror 112 is suitably secured to a metallic back plate 125 which is adjustably held in an inclined position by clamping structure which permits universal adjustment motions of the mirror. Said structure consists essentially of a spherically-shaped bearing surface 126 which is formed on an abutment plate 127, said plate being suitably fixed to the back plate 125 in such a position that the center of curvature of said spherical bearing surface coincides with the fixed optical axis point 111. An annular bearing socket member 128 rides on the bearing surface 126 and said member is secured in any desired manner such as the threaded connection 129 in an inclined plate 131 of the upper part 116 of the subframe 114. A jack screw 130 is threaded into the inclined plate 131 and rests on the base portion 117 whereby the height of the plate may be regulated.

The outer surface 134 of said socket member 128 is provided with a spherical shape having its center of curvature located substantially at the fixed axis point 111 and through the center of said surface an opening 132 is formed. Through the opening 132 extends a clamping bolt 135 which is threaded into the abutment plate 127 radially of the spherical bearing surface 126, the head of the bolt being seated against a clamping disk 136 having a flanged rim part formed peripherally on the underside thereof which contacts the outer spherical surface 134.

For precision adjustment of the mirror 112 about the universal socket mechanism, four angularly spaced adjustment screws 137, two of which are shown, are provided which are threaded through tapped holes in the inclined wall 131 and engage in corresponding conical pits 138 formed in the plate 127. The four screws 137 are equally spaced around a circle which surrounds the socket member 128 and said screws may be selectively tightened or loosened to optically align the mirror 112. A principal advantage of constructing the above-described mechanism in the form of a subassembly is the fact that the operative condition of the cooperating parts thereof may be tested and adjusted, and preliminary optical alignments may be made on the subassembly at the bench before assembling it in the main frame.

The aforesaid photographic plate 113, film pack, or other recording device is suitably held in an adapter 139 of accommodating design as required, said adapter being demountably held against an upright wall 140 in a frame member 14a by a suitable holding catch 141 of well-known construction which engages in a groove 142 in said adapter. A suitable light-tight joint 144 is cooperatively formed on the adjoining parts of said frame member 14a and the upper part of frame 14.

With regard to the mounting of the aforesaid viewing screen 72, a vertical flat mounting surface 145 is provided on the upper part of the frame 14 whereon a holder ring or frame 146 is clamped by a plurality of clamping screws 147 which are seated in said ring and are engaged in tapped holes in the frame. The forward part of the ring 146 is shaped as a projecting light hood 148 to shelter the screen 72 and on the rear part of the ring a light sealing joint 149 is formed cooperatively with a grooved formation on mounting surface 145.

The illumination system mechanism

It is contemplated in the microscope 10 to use a variety of light sources alternatively including incandescent lamps, carbon arc lamps, and other high-intensity lamps, such a source being indicated at 151 in the optical diagrams shown in FIGS. 3 and 4.

The illumination system is comprised of a suitable condenser lens system 152 which converges the light from the light source 151 and fills the aperture stop 153 of said system. On the optical axis 154 of the condenser system 152 the above-mentioned alternate light sources are interchangeably mounted along with their matched condenser lens systems 152, each on a platform 155 which is fixed preferably onto a dovetailed slide 156 and each constituting a subassembly. Slidably fitted against the opposite sides of the slide 156 is a pair of slideway surfaces 157 and 158 formed on respective rails 150, which are mounted transversely of the optical axis 154, said rails being suitably secured to a stationary plate 159 on which the slide 156 rests so as to constitute a solid mounting base for the subassembly.

A demountable mounting mechanism 160 is provided, as shown in FIG. 3, for adjustably and demountably holding the parts of an iris type of diaphragm 163 at the stop 153 in proper optical alignment with the axis 154 and said mechanism is secured to the frame member 14 by a captive screw 160'. Such mechanism comprises a tubular carrier member 161 having a bore 162 wherein is suitably secured the diaphragm 163. For actuating the diaphragm 163, an actuating sleeve 164 is rotatably journaled in the bore 162 within the carrier member 161, said sleeve being operatively connected at one end to said diaphragm 163 and having a suitable knob 165 formed on the other end for rotating the sleeve. A swivel connection is provided between said knob 165 and carrier member 161 by forming a round groove 166 in the peripheral surface of the carrier member 161 wherein a ball 167 is held by a retaining screw 168.

Transverse or lateral adjustments of the entire diaphragm mounting assembly with reference to a stationary bracket member 169 are accomplished by hanging the carrier member 161 on two radially opposed pins 170 and 171, one being an alignment pin 171 which is fixed at one end in carrier member 161 and being slidably fitted at its other end in a bore formed in bracket ring 169a.

The other pin 170 of said radially opposed pins is suitably swiveily secured as illustrated in FIG. 3 at its inner end in the carrier member 161 and is threaded adjacent to its other end into said bracket ring 169a so as to cause lateral movement of the carrier in a plane normal to the optical axis 154 upon rotation of screw 170.

After passing the aperture iris diaphragm 163, the illuminating rays are converged by a first projection lens 172 and pass therefrom through a field diaphragm 173. Projection lens 172 is held in a lens cell 174 which is slidably fitted for a purpose to be described hereinafter into a smooth bore 175 formed in a support tube 176. Formed at the left end of the support tube 176 is a concentric counterbore 177 wherein is rotatably held a diaphragm cell 178 containing the aforesaid field diaphragm 173. Said support tube 176 is rotatably held in a tubular extension 179 which is fixed to a part of the frame 14 and formed substantially coaxially with optical axis 154.

Preferably, the diaphragm 173 is an iris type diaphragm having an interior relatively rotatable actuating ring 178A to which the diaphragm blades are secured, and means for its operation are provided as follows. An actuating pin 181 is suitably anchored at its inner end in the actuating ring 178A and it projects radially outwardly therefrom through a circumferentially elongated slot 182 formed in the diaphragm cell 178 and engages at its outer end in a loosely fitted hole 183 formed in the support tube 176 as shown in FIG. 3 so that the ring 178A rotates with the support tube 176 while the diaphragm cell 178 is stationary. To hold the diaphragm cell 178 stationary, an anchor pin 180 is suitably secured in a fitted opening in tubular extension 179, said pin extending inwardly through a circumferentially elongated slot 180A and into the free fitting opening 180B formed in the diaphragm cell 178.

Exterior operating means for the diaphragm 173 is provided by means of a large flange 184 formed on the exterior end of said support tube 176, said flange abutting against the front surface of the frame part 14 to longitudinally locate the support tube. Adjacent the rim on said flange 184, an axially projecting piece 184A is secured by suitable means such as a screw 185 whereby the support tube 176 may be rotated to operate the iris diaphragm 173 from an exterior location which is accessible to the operator.

Spaced axially from the field diaphragm 173 as shown in FIG. 3 is a deviation prism 186 which deflects the illumination rays vertically through the aforesaid beam dividing prism 16 toward the specimen 12, the deviation prism being mounted in a stationary position by a casing 187. One face 188 of prism 186 is mounted horizontally normal to the vertical portion of axis 15 and thereon is secured by suitable means such as cement a second projection lens 189 which together with said first projection lens 172 and the objective lens 13 forms an image of the illuminated aperture stop 153 at the exit pupil of the objective 13 as shown in FIG. 3. The prism 186 is preferably cemented into the prism casing 187 and is additionally held therein by a strap 187A reaching over the corner of the prism and suitably anchored on casing 187. A lateral flange 191 is formed on the casing, the flange being held by suitable means such as screws 192 which are secured onto the lower surface of a stationary beam divider housing 193 to be described hereinafter.

Further with regard to the illumination mechanism, means are provided to not only change the spectral quality of the light sources and the aperture sizes but also to change the state of polarization or the phase condition thereof. In the case where phase contrast effects are needed, there is provided a second demountable mounting mechanism 194 which constitutes an operative subassembly. Mechanism 194 is supported on a bracket 194' which is held on the frame 14 by the captive screw 194A. Bracket 194' may be substituted on frame 14 for mounting mechanism 160 merely by engaging the clamping screw 194A as shown in FIG. 5.

Mechanism 194 contains an illumination annulus 196 which is secured by cementing or otherwise in one end of a stepped cylindrical sleeve 197. The annulus end thereof has a small diameter 195 extending for a short axial distance so as to enter the bore 175 in the tube 176. For about half of the length of sleeve 197, it has a large diameter 198 which is slidably fitted into a bore 199 in a carrier tube 201 so that the longitudinal position of the illumination annulus 196 may be shifted to various axial positions which are conjugate to the exit pupil of the selected objective in use. The extreme position of the illumination annulus toward the left is shown in FIG. 5 and in order to obtain this range of motion, it is necessary to move the lens 172 axially by a substantial distance.

Such a motion is permitted by biasing the lens cell 174 toward the left along the bore 175 against the pressure of a spring 190 which is seated against a shoulder 175' and bears against the lens cell. The motion of the lens cell 174 due to the spring 190 is limited by a headed screw or peg 190' seated in the cell and engaging in and abutting against either end of a longitudinal slot 200 formed in the support tube 176.

Considerable radial clearance is provided between the small diameter 195 of the reduced portion of the sleeve 197 and the accommodating bore 175 to allow for radial or transverse adjusting motion of the inner member relative to the outer member. This relative lateral or radial adjusting motion is permitted by forming a large radial flange 202 on the carrier tube 201 and securing a collar 203 onto the tube in spaced relation to the flange 202 in a suitable manner such as a screw 203', said flange and collar having confronting radial and parallel surfaces 204 and 205 formed respectively thereon which are fitted slidably against the radial sides 206 and 207 of the bracket 194'.

For the purpose of effecting adjustments of the sleeve 197 and its carrier tube 201 in any radial direction within the parallel surfaces 204 and 205, a pair of angularly spaced centering screws 208 and 209 are threaded radially through a ring portion 194" of the bracket 194' so as to bear against the outer surface of the carrier tube. Symmetrically opposite to the two centering screws in the ring portion 194" is provided a spring actuated pin 211 which yieldably holds the tube 201 against said centering screws. To accomplish this action, the pin 211 is formed with an enlarged head 212 which engages a blind hole 213 formed in the outer surface of the carrier tube and is yieldably held therein by a flat spring 214 which has an opening therethrough so that the spring lies against the head 212 of the pin. The outer ends 215 of spring 214 bear under spring pressure against the inner diameter of the ring 194" as shown in FIG. 7 to maintain a steady pressure of the carrier tube 201 against the adjusting screws 208 and 209.

For moving the sleeve 197 axially to inoperative position, a radial pin 216 is engaged in any suitable manner such as shown in FIG. 5 to said sleeve at the inner end and also is engaged to an actuating ring 217 at its outer end, said pin extending through an axially directed clearance slot 218. The actuating ring 217 is slidably mounted on the outer surface of the carrier tube 201 so that axial motion thereof causes axial adjustments to the illumination annulus 196, and a set screw 219 is threaded through the ring 217 and bears against the outer surface of the tube 201 to lock the ring at a desired setting along the length of said tube. These controls are all arranged in a convenient exterior position for the convenience of the operator.

It will be understood from the description in the foregoing paragraphs that two interchangeable devices are provided for the illumination system, i.e., (1) the iris diaphragm mechanism 160, and (2) the illumination phase annulus mechanism 194, these devices being clamped demountably in operative position by suitable alignment means and by a holding screw 168.

*Mounting and actuating mechanism for the zoom type variable magnification optical system*

For reasons of good optical alignment and reliability of operation, the entire variable magnification optical system 36 is carried by a stationary mounting tube 221 which is supported at its opposite ends in a pair of brackets 222 and 223 as shown in FIGS. 8 and 18 of the drawings. As aforementioned, all of the optical and mechanical parts which effect the change of image size are included in a subassembly 37 which is separately assembled, regulated and tested in finished condition, the assembly 37 being held by a plurality of screws 38, one of which is shown extending through said brackets and anchored in the frame 14. Suitable set screws 224 and 225 are seated in the brackets 222 and 223 so as to engage in accommodating recesses in the mounting tube whereby the tube is locked in the brackets in operative longitudinal and angular alignment with other cooperating parts.

Within the mounting tube 221 is slidably fitted a front lens cell 226 in which a first movable zoom lens 227 is secured as shown in FIG. 8. Rearwardly thereof a rear lens cell 228 is slidably fitted in the mounting tube 221, said cell having secured therein a second movable zoom lens 229 in any preferred manner such as the clamping means shown in FIG. 8. In optical alignment with the zoom lenses 227 and 229 is a field lens 231 which presents the image rays to the zoom lens system, said lens being secured by any suitable means in a focusing sleeve 232 which is threaded for focusing motion within a stationary shell 233. The shell 233 is fixed preferably by screws 234, FIG. 18, to the bracket 222 in such a position that the field lens 231 is optically aligned with the other parts of said optical system.

For sliding the movable lens cells 226 and 228, an operating tube 235 is rotatably mounted on the outer diameter of the mounting tube 221 and axial motion relative thereto is prevented by the end brackets 222 and 223 against which it abuts. Through the wall of the operating tube 235 a pair of differently shaped spiral cam slots 236 and 237 are formed in which a pair of operating pins 238 and 239 engage, said pins being anchored respectively in lens cells 226 and 228, pin 239 in FIG. 8 being shown 180° out of proper angular position. Said pins 238 and 239 also project through and move longitudinally in a pair of axially directed straight slots 241 and 242 respectively which are formed in the mounting tube 221. Comprised within the lens cell 228 is a focusing sleeve 240 wherein zoom lens 229 is mounted, said sleeve being axially adjustably positioned for focusing purposes by its threaded engagement 240' with said cell whereby the individual focusing thereof is accomplished by rotation of the sleeve.

The cam slots 236 and 237 are so relatively helically shaped that when the operating pin 239 is forcibly moved longitudinally of the slot 242 and tube 221 in its cam slot 237 to directly move the rear lens cell 228, the operating tube 235 is rotated, resulting in rotation of cam slot 236 and consequent axial movement of the front lens cell 226. These concomitant motions cause lenses in the two lens cells 226 and 228 to vary the magnification of the image transmitted thereby continuously through a given range of magnification while maintaining the axial position of said image substantially stationary.

By reference to FIGS. 8 and 16, it will be seen that the outer end of the operating pin 239 is moved longitudinally of mounting tube 221 by a rack 243 extending parallel thereto, said rack having an opening wherein the end of said pin is fitted. The rack is slidably held in a slideway 244 which is fixed at its ends to the brackets 222 and 223 by suitable means such as screws 245 seated in said brackets. Engaged with the rack 243 is an idler gear 246 which is meshed with a drive gear 247. Said gear 247 is mounted on a drive quill 248 and is fixed thereon by a connecting pin 249 extending through the gear hub 251 and said quill. For convenient operation, the quill 248 is extended beyond the outer casing 252 of the microscope and a suitable knob 253 is fixed to the outer end to rotate the quill. Where the drive quill 248 passes through the casing 252, a bearing structure 254 is provided having a clamping face 255 which abuts against said casing 252. Formed on the structure 254 is a threaded extension 256 on which a clamp nut 256' is threaded to hold the face 255 tightly against the casing 252.

The erector lens mounting

As mentioned heretofore, the first erector lens 39 of the erecting lens systems is mounted in the rear end of the mounting tube 201 for the purpose of obtaining a dependable optical alignment of the erector lens 39 with the zoom optical system 36 while providing focusing capability and also for the purpose of simplifying and strengthening the mounting mechanism.

To this end, an adjustable lens cell 257 is provided wherein the lens 39 is securely mounted, the exterior of the cell having a threaded connection 258 to the interior surface of the mounting tube 201 so that the cell may be adjusted axially thereof. The lens cell 257 is locked in proper adjusted position by a set screw 259 which is threaded through the wall of the tube 201 and the bracket 223 to bear on the lens cell as shown in FIG. 8. The other mountings for the erecting lenses 56 and 59 are described in an earlier paragraph of this specification.

The phase contrast mechanism

The phase contrast mechanism comprises three optical parts which are: (1) the aforementioned illumination annulus 196 located in the illumination apparatus shown in FIGS. 4, 5 and 6, (2) a phase annulus 261 located in the zoom optical system 36 shown in two operative positions in FIGS. 1 and 8, and (3) the insertable focusing lens 41 for examining the optical alignment of parts 196 and 261 as shown in FIGS. 1 and 8 in operative position.

As heretofore mentioned, the illumination annulus 196 is shown in operative position in FIGS. 4 and 5 and in inoperative position in FIG. 6, said annulus 196 being supported in the above-described demountable mechanical subassembly 194 in such a manner that the annulus 196 may be introduced into the optical system of the instrument. Also described heretofore are the mechanisms for facilitating axial and lateral operational positioning of the illumination annulus 196.

Secondly, because of advantageous optical reasons, the phase annulus 261 must be introduced into the variable magnification optical system 36 at the plane of the exit pupil of the first movable zoom lens 227. Said pupil lies at a substantially constant axial distance rearwardly of said lens 227 at all zoom positions thereof, and throughout a major portion of the magnification range said pupil is positioned in the clear space 262 between lenses 227 and 229 thereby permitting the phase annulus 261 to be inserted at said pupil. Said annulus 261 is properly secured in a thimble 263 which is fitted tightly into a bore in a carrier block 264.

Mechanism for inserting the phase annulus 261 into the zoom optical system 36 in the space 262 between the zoom lenses 227 and 229 is provided as shown in FIG. 8 comprising an apertured carrier block 264 which is moved into said space laterally or normal to the axis of the zoom lenses through a pair of large aligned openings 265 and 266 formed in the carrier tube 201 and operating tube 235 respectively. Since as aforesaid it is necessary that the phase annulus 261 remain at a constant distance from the zoom lens 227 while in use, the carrier block 264 is demountably attached thereto so as to travel axially therewith by connecting means consisting of a coupling or alignment pin 267 and a coupling or alignment key 268 as best shown in FIG. 10. The coupling pin 267 is fixed in a bore formed in the entering side of said block and the key 268 is provided with a beveled leading edge 271 for facilitating engagement with the keyway 269. The key 268 is closely fitted into a cross slot 269 formed crosswise to the longitudinal axis of the block 264 and in the side opposite to the pin 267, said key being secured therein by a cap screw 270. In the annular extension 272 of front lens cell 226 is formed an opening 273 which receives the coupling or alignment pin 267 and oppositely thereto is provided a cross slot 274 which is slidably fitted to receive the coupling key 268, the uncoupled position of the coupling members being shown in FIG. 8.

In order to accomplish the engagement of said coupling members 267 and 268, these members are mounted on a pair of narrow fingers 275 and 276 respectively which are formed on and extend longitudinally from the forward side of the carrier block 264, said mechanism being shown per se in FIG. 10. Said fingers 275 and 276 are fitted to pass freely vertically through a longitudinal opening 277 formed adjacent to the cross slot 274 in the annular extension 272 shown in FIG. 9. Advantageously, the engagement of the finger 276 with the sides of the opening 277 together with the simultaneous engagement of the coupling pin 267 with the opening 273 results in the phase annulus 261 being reliably held in axial alignment with the lenses 227 and 229 in the zoom optical system 36.

For moving the hollow carrier block 264 vertically into operating position in the direction of the arrow a as shown in FIG. 8, said block is rigidly fixed onto a strut 278 projecting laterally of the optical axis from a crosshead 279. Said crosshead is slidably mounted on a pair of longitudinally extending parallel support rods 281 and 282 which are anchored at their ends in a pair of opposed upstanding mounting brackets 283 and 284. A flat plate 285 lying parallel to the carrier tube 201 and parallel to the axis of the pin 267 is provided on which the brackets 283 and 284 are fixed by suitable means such as cap screws 286, said plate being slidably mounted for motion to and from tube 221 on a pair of parallel slideways 287 and 288. Said slideways are formed on a pair of parallel rails 289 and 290 which extend contiguous to and along the edge of plate 285 in a direction normal to carrier tube 201 and are preferably attached to a base plate 291 by a plurality of cap screws 292.

As best shown in FIGS. 1 and 8, when the block 264 is locked into operating position in the sleeve 272, the block as well as all parts connected thereto will thereafter be carried by said sleeve axially of the tube 221 on the rods 281, 282 by means of the interlocking connection 274, 268. However, when the block 264 is disengaged laterally from sleeve 272, it is maintained in the same longitudinal position ready for reentry with the sleeve 272 by a spring 293 which urges it against a stop collar 294 so as to establish said position.

Mechanism for moving the slidable plate 285 into operating position along the slideways 287 and 288 is provided comprising a rack 295 which is attached parallel to said slideways on the back face of said plate 285. In mesh with the rack 295 is a gear 296 which is mounted on a shaft 297. Said shaft is rotatably mounted in at least one stationary bracket 298 which is secured in any desired manner on the base plate 291 and said shaft 297 is rotated by an exteriorly positioned knob to be described hereinafter.

There is a prerequisite condition which must be met before the phase annulus block 264 can be placed in operative position in the carrier tube 201. Because of optical conditions of the zoom optical system, the phase annulus 261 cannot be introduced into the zoom optical system 36 until the lenses 227 and 229 are positioned at a specified axial position corresponding to a specified magnification in the lower part of the magnification zoom range.

For compliance with said prerequisite condition, a lockout device is provided operationally between the actuating quill 248 for moving the longitudinal rack 243 and the phase plate actuating shaft 299 for moving the phase annulus positioning rack 295. Said lock-out device depends on the action of a lock pin 301 which is slidably fitted at one end into a bore 302 formed in a stationary plate 303. At the other end, the lock pin 301 is slidably fitted into a bore formed in a supporting plate 304. The plate 304 is fixed to plate 303 by any suitable means such as the screws 305 as shown in FIG. 11. Contiguous to the supporting plate 304 is located a locking disk 306 which is nonrotatably pinned to the shaft 299 by a shear pin 307 extending through said shaft and the integral hub 308 on the disk. Between the bore 302 and supporting plate 304 is formed a clearance recess or counterbore 309 around the lock pin 301.

It is essential that the lock pin 301 be considerably longer than the sum of the thicknesses of plates 303 and 304 so that it protrudes therefrom at one side or the other. When the pin 301 is moved to the right in FIG. 11, it enters an aligned locking recess or hole 311 in the disk 306 which immobilizes or locks the disk rotationally as shown in FIG. 12.

Means for moving the pin 301 into locking position is provided comprising a cam surface 312 formed in the radial face of the integral gear hub 313 so that rotation of the gear 247 by the actuating quill 248 causes the cam surface to rotate. The pin 301 is urged against the cam surface 312 by a compression spring 314 which is housed in the counterbore 309 and is seated under spring stress between a shoulder 315 formed on pin 301 and the supporting plate 304. As shown in FIG. 11, when the lock pin 301 rests in the deepest part of the cam surface 312, said pin is disengaged from the disk 306 and the locking mechanism is inactive. In this condition the shaft 299 may be rotated by the knob 316 to move the phase annulus and its associated operating parts into operative position by means of gear 296 and rack 295. Thereafter any rotation of the zoom actuating gear 247 will cause the cam 312 to move the lock pin 301 into locking position in the hole 311 so that the phase annulus 261 is locked in operative position. In this condition the phase annulus block 264 becomes a part of the zoom mechanism in effect and moves with it.

When it is desired to disengage the phase annulus block 264, the zoom mechanism is rotated until the aforesaid specified axial position of the lenses 227 and 229 is reached corresponding to the positions shown in FIG. 11 whereupon the lock pin 301 is again moved out of the locking hole 311 to permit relative rotation of the disk 306. As shown in FIG. 13, said specified axial position which permits disengagement of the phase block 264 is indicated by the alignment of two adjacent indicia 260 and 260' formed on the knobs 253 and 316 respectively.

However, subsequent rotation of the disk 306 to disengage the phase annulus block 264 results in misalignment of the locking hole 311 so that a second locking hole 317 must be provided as shown in FIG. 20 separated from the first locking hole 311 by an angle $a$ corresponding to the distance traveled by the rack 295 during its total disengaging movement. After the phase annulus block 264 has been completely disengaged as shown in FIG. 8, the locking pin 301 is aligned with locking hole 317 and subsequent rotation of the zoom gear 247 causes the locking pin to enter hole 317 to prevent the reengagement of the phase annulus.

Comprised in the aforesaid photographic mechanism is the shutter operating unit 320 which preferably comprises an iris type shutter 319, shown in FIG. 2. For actuating the shutter 319, a trip control knob 321 is operatively connected to said shutter by suitable mechanism such as a Bowden wire or otherwise and a reset knob 322 is similarly connected to the shutter to position the shutter for a subsequent operation. A timer control knob 323 for actuating any well-known timer mechanism, not shown, is incorporated in the shutter operating unit 320.

Further comprised in the photographic mechanism is a photometric unit which is generally indicated at 324 and is located on a ninth portion 325 of the optical axis originating at the second fixed point 44 and directed coextensively with axis portion 46 from the mirror 45. Light which is deviated by the mirror 45 along the axis 325 is focused by a positive lens 326 upon an aperture 327 formed in an aperture plate 328 and these elements are fixed in any suitable manner as shown in FIG. 1 in a mounting tube 329. The light passing the aperture 327 is scattered by a light diffusing plate 331 mounted in any desired manner in the tube 329 rearwardly of the aperture, and still further along the axis is provided a suitable light sensing device 332 such, for instance, as the well-known electronic phototube designated RCA-931A which is optically aligned with the transmitted beam of light coming from the diffuser plate 331.

All of the above-described mechanism is mounted on a base member 333 which is adjustably attached to a stationary chassis plate 334 by any preferred attachment means such as the screws 335. A suitable cover 336 is attached to the base member 333 to enclose and protect the photometric unit 324. It is understood that an indicating meter of suitable properties is supplied along with the photometric unit 324 and is electrically connected thereto by leads 337, said meter being located on a control console, not shown, adjacent thereto.

*Mounting for color correcting lenses and plural reticle plates*

As aforementioned, a plurality of lateral color compensating lenses 18 and 19 is selectively movable angularly into position in optical alignment with the optical axis 17 by a mechanical mounting device 21. In the aforesaid sector-shaped lens carrier 22, as shown in FIGS. 14 and 15, is secured a pair of individual mounting shells 340 and 341 preferably by means of mating threads 342 which are cooperatively formed on the carrier 22 and said mounting shells. The lenses 18 and 19 are secured respectively in individual lens cells 343 and 344 respectively by a plurality of angularly spaced radial holding and centering screws 345 which are threaded through the walls of said mounting shells 340 and 341 as shown in FIGS. 14 and 15 and bear against a beveled surface formed on the top edge of said cells. Selective tightening of screws 345 facilitates centering adjustment of lenses 18 and 19.

The lens carrier 22 has an elongated hub 346 formed thereon having a bore therein, and an operating shaft 347 is fitted into said hub and is journaled at its upper and lower ends in stationary bracket members 348 and 349 so that said carrier 22 swings in an arcuate path about the shaft.

On the shaft 347 and below the carrier 22 is mounted a reticle holding wheel 20 as aforementioned, said wheel being provided with a plurality of equiangularly spaced apertures 351. In each aperture is counterbored a seating surface 352 whereon the aforesaid reticle plates 23 are seated. For the purpose of holding said plates 23 on the surfaces 352, said apertures are provided with threads 353 wherein exteriorly threaded clamping rings 354 are threaded so as to bear against said plates as shown in FIG. 14.

In order to rotate the reticle wheel 20, there is preferably provided a flexible drive shaft 355 which is connected through a suitable connector 356 fixed to the shaft 347. The other end of the shaft 355 is connected to an exterior control knob 357 by a suitable connector 358 which is fixed to the knob and shaft so that rotation of shaft 347 is effected.

Rotation of the lens carrier 22 is effected by extending the hub 346 of said carrier and securing thereon a gear 359 by means of a set screw 361 or otherwise. The gear 359 is rotated by a drive gear 362 suitably held by mechanism, not shown, in mesh therewith, the drive gear being rotated preferably by a flexible shaft 363 which is turned by an exterior knob, not shown, similar to knob 357.

Detent means are provided for locating the optical axis of either of the lenses 18 and 19 in an angular position which is substantially coaxial with the optical axis 17, said means comprising a detent member 364 which is mounted so as to contact the underside of the carrier 22 on a laterally adjustable block 365. Said block is held by a pair of screws 366 which extend through oversized holes in the block, said screws being threaded into tapped holes in a stationary element of the frame 14. Controlled lateral adjustment of the detent 364 is provided by an adjusting screw 367 which is swively retained by a suitable connection in the frame element 14 and threaded into the block 365 as shown in FIG. 15. The detent 364 engages in a radial groove 368 formed in the underside of the carrier extension 22' when lens 18 is in operating position, and a second radial groove or notch 369 is provided in the underside of the carrier 22 at an angular measurement of 90° away from groove 368, the detent 364 engaging in the groove 369 when lens 19 is properly operatively aligned with axis 17.

Similar detent mechanism is provided for angularly positioning the reticle wheel 20 comprising a detent 371 which is mounted similarly to detent 364 in an adjustable block 372. The underside of the reticle wheel 20 is provided with a plurality of radial grooves 372 wherein the detent 371 engages, said grooves being formed in the underside of the wheel 20 as shown in FIG. 14.

From the foregoing description of the principal components of the complex metallographic microscope, it will be seen that there is here provided a combination of mechanism which so aligns and supports the otpical parts thereof that said microscope is advantageously adaptable to a wide variety of microscope examinations and specimens which vary in kind, material, shape and bulk, the operating parts thereof being reliable in action, easy to operate from a natural position of the operator, and easily and quickly converted from one type of examination to another while the mechanism involved is protected and confined to a maximum degree in a secure housing.

Although certain parts and subassemblies have been shown and described as being of preferred form, other forms are possible and changes may be made in the details of construction and arrangements thereof and substitutions may be made therein without departing from the spirit of the invention as set forth in the appended claims.

I claim:

1. An inverted microscope of the metallographic type comprising:
   a stage on which a specimen is held,
   a frame whereon said stage is carried,
   means for mounting a microscope objective on said frame in vertical position and in optical alignment with said specimen,
   a beam divider and means for mounting said beam divider below said objective in alignment with a first portion of objective axis, said beam divider being constructed to provide a beam of image rays which is directed downwardly and rearwardly therefrom along an inclined second portion of the optical axis of the microscope,
   a deviation prism located below said beam divider in said first optical path and aligned with said objective to deviate light which is projected along a horizontal axis to the objective,
   a light source and a condenser lens mechanism mounted in said horizontal axis in optical alignment with said deviation prism for illuminating said specimen by light rays projected along said first path successively through the deviation prism, beam divider and objective,
   a lateral chromatism compensating lens, and mechanical means for mounting said lens on said second portion of axis, said lens being located between the objective and a focal point formed cooperatively by the objective and compensating lenses,
   means for mounting a plane mirror at a fixed point on said second portion of axis and inclined at such an angle thereto that said mirror deflects said beam along a third portion of axis upwardly of said fixed point to a second mirror located higher than said stage, the means for mounting said second mirror being positioned on said third axis portion so as to direct image rays upwardly toward and above said stage,
   a continuously variable magnification lens system optically aligned on said third portion of axis upwardly of said first plane mirror, said lens system having two movable lens cells which are moved simultaneously axially differentially with respect to a fixed point on said axis,
   means for mounting and actuating said movable cells,
   means for holding said mirror at a second fixed point on said third axis portion and so inclined thereto as to deflect the image rays coming from said variable magnification lens system toward and above said stage along a fourth portion of axis.
   means for mounting an erector lens system which includes two erector lenses, one of which is located on said third axis portion and the other erector lens is located on said fourth axis portion, said erector lenses serving to provide a stationary image on said fourth axis portion, and
   means for mounting an eyepiece on said fourth axis portion above said stage in an axial position in which said eyepiece is focused upon said stationary image.

2. An inverted microscope according to claim 1 which is additionally characterized by a reticle holding shaft journaled on said frame parallel to the second axis portion, a reticle wheel which is rotatably mounted on said shaft, said wheel having means defining a plurality of openings wherein reticle cells are held in alignment with said second axis portion, said wheel being so axially located that the article in each cell is parfocalized at the image plane formed cooperatively by said objective and said compensating lens, frictional detent means cooperatively formed on said wheel and frame for stopping rotation of said wheel so that the individual reticle cells are selectively optically aligned on said second axis portion, and means for rotating said wheel.

3. An inverted microscope as set forth in claim 1, said microscope being further characterized by a rotatable lens carrier having a plurality of openings wherein a like number of color compensating lenses are held at radial locations equidistant from a center of rotation of the carrier and substantially aligned on said optical axis at an axial position on the objective side of said focal point,
   a mounting shaft journalled in aligned openings formed in said frame in a stationary position parallel to and spaced from said second axis portion at a lateral distance therefrom substantially equal to the distance between said radial location and said center of rotation,
   means including an elongated hub formed on said carrier and fitted to the shaft for rotatably mounting said carrier on said shaft,
   means for rotating said carrier, and
   detent means for releasably holding said carrier in an operative angular position.

4. An inverted microscope as set forth in claim 3 and further characterized by a reticle shell which is rotatably mounted coaxially on said mounting shaft in tandem with said lens carrier, said wheel having a plurality of openings which are alignable with said second axis portion wherein a plurality of reticle cells are held, the reticle wheel having such an axial location that the reticles held therein are al parfocalized at the image plane formed cooperatively by said objective and compensation lens, detent means carried by said frame and cooperating with detent elements formed on said wheel for releasably arresting rotary motion of said wheel at the location of each reticle, and means for rotating said reticle wheel.

5. An inverted microscope as set forth in claim 1 and further characterized by said means for mounting and actuating said movable lens cells comprising:

a mounting tube wherein the aforesaid two lens cells are slidably mounted, support means fixed to the oppoiste ends of said tube and anchored in said frame so as to hold the tube stationary coaxially with said third portion of axis, an actuating sleeve rotatably journaled on said tube and longitudinally held in endwise abutment against said support means, a pair of parallel helical tracks defining a slot formed in said sleeve, an actuating pin engaging said tracks and extending outwardly therefrom, said pin extending inwardly through an axially elongated slot in the mounting tube and being secured in one of said cells, a second pair of helix-like tracks defining a slot which is formed in said sleeve and is axially located near the other of said cells, a cam follower pin engaging the second pair of tracks and extending through a second axial slot in said sleeve and seated in said other lens cell so that motion of said actuating pin axially of said tube simultaneously causes movement of both of said cells, a rack in which said first actuating pin is fixed, said rack being fixed to said support means, and means including a geared connection engaging said rack for moving said rack.

6. An inverted microscope as set forth in claim 5 and further characterized by the aforesaid erector lens which is located on the third axis portion being fixed in the rear part of said mounting tube for effecting superior optical alignment between said erector lens and said variable focus lens system.

7. An inverted microscope as set forth in claim 1 and further characterized by said means for mounting and actuating said movable lens cells comprising:

a mounting tube wherein the aforesaid two lens cells are slidably mounted, support means fixed to the opposite ends of said tube and anchored in said frame so as to hold the tube stationary coaxially with said third portion of axis, an actuating sleeve rotatably journaled on said tube and longitudinally held in endwise abutment against said support means, a pair of parallel helical tracks defining a slot formed in said sleeve, an actuating pin engaging said tracks and extending outwardly therefrom, said pin extending inwardly through an axially elongated slot in the mounting tube and being secured in one of said cells, a second pair of helix-like tracks defining a slot which is formed in said sleeve and is axially located near the other of said cells, a cam follower pin engaging the second pair of tracks and extending through a second axial slot in said sleeve and seated in said other lens cell so that motion of said actuating pin axially of said tube simultaneously causes movement of both of said cells, a rack in which said first actuating pin is fixed, said rack being fixed to said support means, means including a geared connection engaging said rack for moving said rack, power means for longitudinally moving one of said actuating pins to rotate said sleeve, a mounting block having a bore therethrough parallel to said optical axis in which a phase plate is held, said block having a support strut formed thereon laterally of said axis, means including a crosshead which is fixed to said strut and is mounted for lateral movement relative to the optical axis for the purpose of moving said block from an operative position on said axis intermediate between said lens cells laterally to an inoperative position free of said actuating sleeve through an aligned lateral opening in said tube and sleeve, means for connecting said block when in operative position onto the foremost of said zoom lens cells so as to be moved axially thereby when aligned on the optical axis whereby said phase plate is maintained in the exit pupil of the front zoom lens held therein for all axial positions thereof, means for mounting said crosshead for motion parallel to said axis while said block is in said operative position and means for viewing the image produced by said variable magnification optical system.

8. A microscope as set forth in claim 7 further characterized by:

said means for connecting comprising a pair of axially projecting parallel and narrow fingers formed diametrically opposite to each other on the end of the block which is adjacent to said foremost lens cell, a protruding alignment pin secured radially in the forward end of one of said fingers in alignment and engageable with a slidably fitted bore which is formed in one side of the wall of said front lens cell, an alignment crossbar formed across the forward end of the other of said fingers so as to follow behind said alignment pin during its engaging movement, and a plurality of parallel walls forming an open-ended cross slot in the opposite side of said wall of the front zoom lens cell, said parallel walls being shaped to slidably fit around the profile of said finger and crossbar so that said alignment pin and crossbar effectively couple the front zoom lens cell to said mounting block for axial movements together during use of said phase plate.

9. An inverted microscope as set forth in claim 7 further characterized by lockout means which are operatively constructed between said actuating sleeve and said crosshead in such a manner that the crosshead is prevented from moving said phase mounting block into operative axially aligned position on the foremost of said zoom lens cells except when said lens cells are axially located in a specified zooming position near the low magnification end of the movement of said cells.

10. An inverted microscope as set forth in claim 7 further characterized by said lockout means including:

a phase plate actuating shaft which is rotatably mounted in a fixed position near said crosshead, means operatively connected between said shaft and crosshead to convert the rotation of the shaft into movement of said crosshead, an elongated actuating quill mounted concentrically of said shaft, the outer ends of both the quill and shaft terminating exteriorly of said microscope and having individual knobs attached thereto in tandem relation to each other, gearing means operatively connected between said quill and said lens cell actuating pin for moving said pin and consequently rotating said lens actuating quill, a disk fixed radially of and to said actuating shaft, a cylindrical wall defining a bore through said disk which is radially spaced from the actuating shaft and extends substantially parallel to the shaft, a stationary intermediate plate positioned crosswise of said shaft between said gearing means and disk, a lock pin slidably mounted in said plate in a position parallel to said bore and engageable therewith, said lock pin being longer than the thickness of said plate and being spring biased toward said gearing means so that when the pin is flush with the side of the plate nearest to the disk, the opposite end thereof projects beyond the plate, and a radial face cam rotatably connected to said actuating quill and positioned adjacent to said intermediate plate, said cam being of reentrant shape with the deepest part of the cam surface being angularly positioned contiguous to and in radial alignment with the projecting end of said lock pin when said part is also located in longitudinal alignment with said bore in the disk, the lock pin when so located being disengaged from said bore by action of the spring so that the actuating shaft may be independently rotated to shift said phase plate into operative position, and when the cam is alternatively rotated away from angular alignment with said bore, the lock pin is biased into locking position in said bore in the disk by said cam whereupon said shaft is immobilized.

References Cited

UNITED STATES PATENTS

| | | | |
|---|---|---|---|
| 2,660,923 | 12/1953 | Benford | 350—91 X |
| 2,662,443 | 12/1953 | Loeck | 350—43 |
| 3,030,861 | 4/1962 | Mortimer et al. | 350—43 X |
| 3,045,545 | 7/1962 | Korones et al. | 350—41 |
| 3,202,047 | 8/1965 | Lawler | 350—49 |
| 3,237,518 | 3/1966 | Krajowsky et al. | |

DAVID SCHONBERG, *Primary Examiner.*

D. H. RUBIN, *Examiner.*

P. R. MILLER, *Assistant Examiner.*